United States Patent Office 3,236,624
Patented Feb. 22, 1966

3,236,624
METHOD FOR SELECTIVELY KILLING
UNDESIRED PLANTS
Henry Martin, Basel, and Hans Aebi, Riehen, Switzerland,
assignors to Ciba Limited, Basel, Switzerland, a company of Switzerland
No Drawing. Filed Nov. 5, 1962, Ser. No. 235,531
Claims priority, application Switzerland, Aug. 21, 1959,
77,208/59
The portion of the term of the patent subsequent to
May 26, 1981, has been disclaimed
8 Claims. (Cl. 71—2.6)

This is a continuation in part of our copending application Serial No. 46,346, filed August 1, 1960, now U.S. Patent No. 3,134,665.

The present invention is based on the unexpected observation that N-phenyl-N'-alkyl-ureas which contain a trifluoromethyl group and are halogen-substituted in the phenyl nucleus and correspond to the general formula (I)

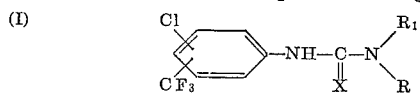

in which R represents a lower alkyl group, $R_1$ represents a hydrogen atom or a lower alykl group and X represents an oxygen or sulfur atom, possess selective herbicidal action. The present invention therefore relates to a method for selectively combating undesired plants growing beneath crop plants, wherein there is applied to the area in which the herbicidal effect is desired, in an amount which is sufficient to kill the undesired plants a compound of the general Formula I set forth above.

Abel et al. described in "Chemistry and Industry" (1957) at page 1106 the inhibition of the so-called Hill-reaction, which is used to measure the photolysis of water in the presence of isolated chloroplasts, by N-4- and N-3-trifluormethyl-phenyl-N',N'-dimethyl urea. From this inhibiting action the useful selective herbicidal properties of the claimed new compounds could of course, not be expected.

Among the compounds of the above Formula I there are especially useful those of the general formula

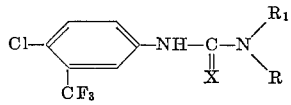

in which X, R and $R_1$ have the meanings given above. Among the compounds of the latter formula there are preferred those in which R represents a methyl or ethyl group and $R_1$ a hydrogen atom, or methyl or ethyl group.

The compounds of the above general formulae can be made by the application of known general methods, all the customary methods for making derivatives of urea or thiourea being generally suitable. There are indicated below a few methods, but these are not to be regarded as exhaustive; (the halogen-substituted phenyl radical containing a trifluoromethyl group is denoted by the symbol Ar, and R and $R_1$ in the formulae below represents methyl groups)

(a)
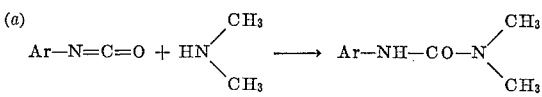

Instead of isocyanate, there may be used a substance that forms isocyanate or splits off isocyanate (b)
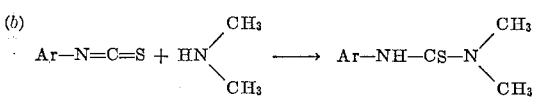

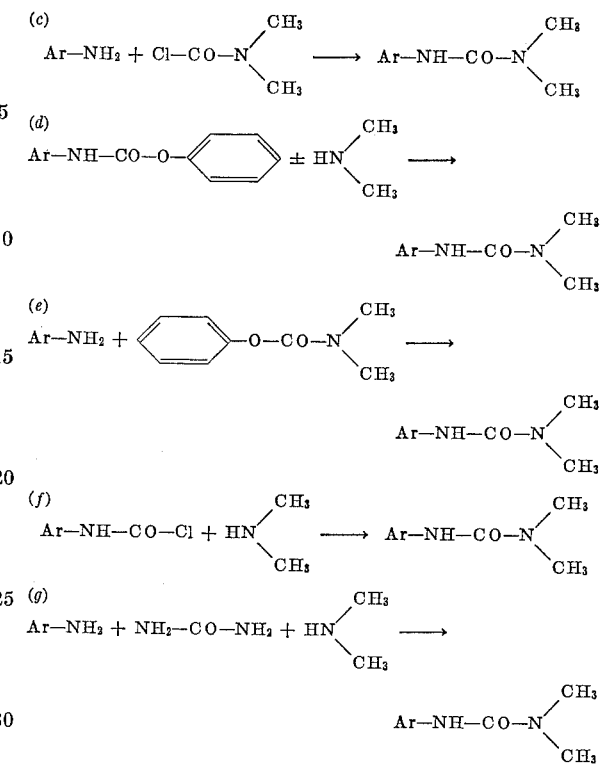

For use the compounds of the general Formula I are advantageously made up into preparations, which are also included in the invention. The active substance may be used in emulsified, dispersed or dissolved form or in the form of dusting preparations.

The compounds may be used alone or together with other selective herbicidal substances, or with borax or other inorganic salts, such as abraum salts, calcium cyanamide, urea or other fertilizers, or pest combating agents, for example, chlorinated hydrocarbons or phosphoric acid esters.

For making solutions to be used for direct spraying there may be used organic solvents, preferably boiling above 100° C., for example, mineral oil fractions of high to medium boiling range, such a diesel oil or kerosene, or coal tar oils or oils of vegetable or animal origin and also hydrocarbons, such as alkylated naphthalenes, tetrahydronaphthalene, if desired, with the use of mixtures of xylenes, cyclohexanols, ketones, also chlorinated hydrocarbons, such as tetrachlorethane, trichlorethylene or tri- or tetrachloro-benzenes.

Aqueous preparations for direct use can be prepared by mixing water with an emulsion concentrate, paste or wettable powder containing the active substance. As emulsifying or dispersing agents there may be used non-ionic substances, for example, condensation products of aliphatic alcohols, amines or carboxylic acids having long-chain hydrocarbon radicals containing about 10 to 30 carbon atoms, with ethylene oxide, such as the condensation product of octadecyl alcohol with 25 to 30 mols of ethylene oxide, or a condensation product of commercial oleylamine with 15 mols of ethylene oxide, or a condensation product of dodecyl-mercaptan with 12 mols of ethylene oxide. Among anion-active emulsifying agents, that may be used, there may be mentioned the sodium salt of dodecyl alcohol sulfuric acid ester, the sodium salt of dodecyl-benzene-sulfonic acid, the potassium or triethanolamine salt of oleic acid or of abietic acid, or mixtures of these acids, or the sodium salt of a petroleum sulfonic acid. As cation-active emulsifying agents there may be mentioned quaternary ammonium compounds, such as cetyl-pyridinium bromide or dihydroxybenzyl-dodecyl-ammonium chloride. For making dusting or scattering preparations there may be used as carriers talcum, kaolin, bentonite, calcium carbonate or calcium phosphate, or carbon, cork meal or wood meal, and other materials of vegetable origin. It is very advantageous to make up the preparations in a granular form. The various preparations can be rendered more suitable for the methods in which they are to be used by the known addition or substances which improve the dispersion, adhesiveness, resistance to rain or penetration capacity of the compositions. As such substances there may be mentioned fatty acids, resins, glue, casein or, for example, alginates or the like.

The herbicidal preparations of this invention are suitable e.g. for the selective destruction of weeds under crop plants. The term "weeds" is used in this connection to include undesired plants, for example plants previously planted on the area which is to be treated.

The following examples illustrate the invention:

EXAMPLE 1

443 grams of 3-trifluoromethyl-4-chlorophenyl isocyanate, dissolved in 200 cc. of acetone, are added slowly to 270 cc. of an aqueous dimethylamine solution of 40% strength in 1500 cc. of water while stirring vigorously. With a slight increase in temperature to 40° C., the condensation to give N - 3-trifluoromethyl - 4-chlorophenyl-N':N'-dimethyl urea takes place, this being immediately precipitated in a technically pure state. After stirring for six hours, a little water is added and the urea is filtered off with suction, washed with water and a little dilute acetic acid and dried in vacuo at 60° C. Crude yield: 516.0 grams; melting point: 137 to 138° C. A test sample recrystallized from alcohol shows a melting point of 139 to 140° C.

$C_{10}H_{10}ON_2ClF_3$:
  Calculated—N, 10.5%; Cl, 13.3%
  Found—N, 10.18%; Cl, 13.03%.

Prepared under the same conditions, N-3-trifluoromethyl-4-chlorophenyl-N'-methyl-N'-n-butyl urea appears as oil which boils at 0.01 mm. between 170 and 180° C. Solidification point: 54.5 to 55.5° C. Condensed with monomethylamine, 3-trifluoromethyl-4-chlorophenyl isocyanate gives under the same conditions N-3-trifluoromethyl-4-chlorophenyl-N'-methyl urea having a melting point of 130 to 131° C.

$C_9H_9ON_2ClF_3$:
  Calculated—N, 11.09%; Cl, 14.04%
  Found—N, 11.18%; Cl, 13.65%.

EXMPLE 2

22 grams of 2-chloro-5-trifluoromethylphenylisocyanate are dissolved in 25 cc. of acetonitrile and added drop by drop to an aqueous dimethylamine solution of 40% strength. The temperature slowly increases to 46° C. During this process the urea is precipitated in semi-solid form. Stirring is continued for some hours, the product solidifying. The product is filtered off, washed with water and dried in the air. The crude yield is 25 grams. Recrystallized from alcohol and water, the product shows a melting point of from 98 to 99° C.

$C_{10}H_{10}ON_2ClF_3$:
  Calculated—N, 10.5%
  Found—N, 10.53%.

In the same way as the described in Examples 1 and 2, the following urea derivatives can also be prepared.

(a)  melting point 116 to 117° C.

N-3-trifluoromethyl-4-chlorophenyl-N':N'-diethyl urea (b) 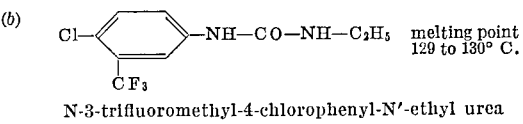 melting point 129 to 130° C.

N-3-trifluoromethyl-4-chlorophenyl-N'-ethyl urea (c) 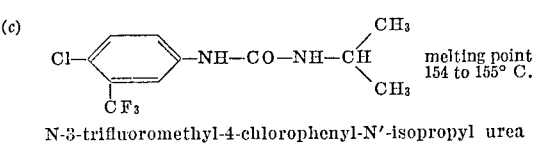 melting point 154 to 155° C.

N-3-trifluoromethyl-4-chlorophenyl-N'-isopropyl urea (d) 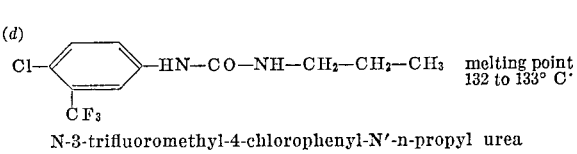 melting point 132 to 133° C.

N-3-trifluoromethyl-4-chlorophenyl-N'-n-propyl urea

EXAMPLE 3

210 grams of 3-trifluoromethyl-4-chlorophenyl isothiocyanate (distilled under 11 mm. of pressure at 119–120° C.; under 0.04 mm. at 70–73° C.), dissolved in 200 cc. of acetone, are added drop by drop to 1 liter of water and 130 cc. of aqueous dimethylamine solution of 40% strength while stirring. N-3-trifluoromethyl-4-chlorophenyl-N':N'-dimethyl thiourea is precipitated in the process. This is filtered off, washed with water and a little dilute acetic acid and dried in vacuo at 60° C. The crude yield is 244 grams. The crude condensation product has a melting point of 157–158° C. Recrystallized from alcohol, the compound melts at 159–160 °C.

$C_{10}H_{10}N_2ClF_3S$:
  Calculated—N, 9.91%; Cl 12.54; S, 11.35%
  Found—N, 10.12%; Cl 12.60%; S, 11.45%.

EXAMPLE 4

20 parts of N-3-trifluoromethyl-4-chlorophenyl-N':N'-dimethyl urea and 80 parts of talc are ground very finely in a ball mill. The mixture so obtained is used as a dusting agent.

EXAMPLE 5

20 parts of N-3-trifluoromethyl-4-chlorophenyl-N':N'-dimethyl urea are dissolved in a mixture of 48 parts of diacetone alcohol, 16.5 parts of xylene and 16 parts of a condensation product of ethylene oxide with higher fatty acids, for example the condensation product of soyabean fatty acid and 30 mols of ethylene oxide. This concentrate may be diluted with water to give emulsions of any desired concentration. It is also possible to employ N-3-trifluoromethyl-4-chlorophenyl-N'-methyl urea.

EXAMPLE 6

80 parts of N-3-trifluoromethyl-4-chlorophenyl-N':N'-dimethyl urea or equal parts of N-3-trifluoromethyl-4-chlorophenyl-N'-methyl urea are mixed with 4 parts of a wetting agent, for example the sodium salt of butyl-naphthalenesulfonic acid, 1 to 3 parts of a protective colloid, for example sulfite waste liquor, and 15 parts of solid inert carrier such a kaolin, chalk or kieselguhr and thereupon finely ground. The wettable powder obtained may be mixed with water before used and gives a suspension which is ready for use.

EXAMPLE 7

15 parts of N-3-trifluoromethyl-6-chlorophenyl-N'-:N'-dimethyl urea are dissolved in 90 parts of coal-tar oil, diesel oil or spindle oil.

EXAMPLE 8

To 10 grams of compounds (a), (b), (c) and (d) there are added separately in each case 2 grams of waste sulfite pulp liquor and 100 cc. of water and the mixture is thereafter subjected to intensive grinding, whereby finely divided, stable dispersions are obtained.

The compounds (a), (b), (c) and (d) correspond to the following formulae (a) 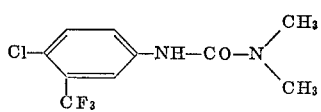

(b) 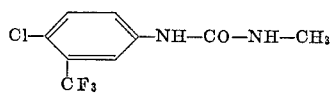

(c) 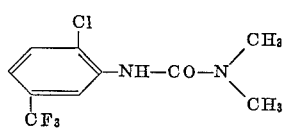

(d) 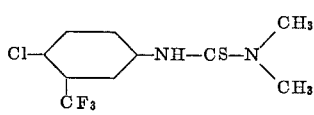

EXAMPLE 9

80 parts of compounds (a) and (b) are mixed with 16 parts of kaolin and 4 parts of an emulsifier supplied by Ninol Inc., Chicago, under the trademark "Toximul MP" and finely ground. The mixtures can be used as spraying powders.

EXAMPLE 10

Flower pots are filled with earth in a greenhouse and sown with seeds of the weeds and cultivated plants named hereunder: *Zea mays, Avena sativa, Setaria italica, Dactylis glomerata, Sinapis alba, Lepidium sativum, Calendula chrysantha.*

The plants are sprayed with a spraying liquid obtained from the dispersions (a) to (d) according to Example 8, the quantity of each active substance employed corresponding to 10 kg. per hectare. As the absorption of the active substance also takes place through the leaves, the treated plants, with the exception of *Zea mays*, which was practically not inhibited, already died off completely or almost completely after 14 days.

EXAMPLE 11

(A) From each of the compounds set forth above in Example 8 under (a) to (d) there was made a wettable powder of the following composition:

20% by weight of active substance.
25% by weight of finely divided $SiO_2$.
3.5% by weight of a condensation product of 1 molecular proportion of dodecyl mercaptan and 12 molecular proportions of ethylene oxide.
1.5% by weight of a condensation product of 1 molecular proportion of p-nonyl phenol and 9 molecular proportions of ethylene oxide, and
50% by weight of kaolin (bolus alba) by mixing and grinding.

The following tests were carried out with so-obtained "compositions (a), (b), (c) and (d)."

Pre-emergency

Flower pots were filled with earth in a greenhouse and sown with seeds of the plants named below in Table I. The earth was watered and treated on the day after sowing with an aqueous dispersion obtained by diluting the "composition (d)" set forth above, with water. The quantity of the active substance employed corresponded to 3 kg./hectare. The concentration of the active substance in each spraying liquor was 0.60%. The results of the treatment were examined 3 weeks later.

TABLE I

| Test plants | Composition(d) |
|---|---|
| Daucus carota | Not inhibited. |
| Linum usitatissimum | Only slightly inhibited. |
| Alopecurus pratensis | Completely killed. |
| Poa trivialis | Do. |
| Dactylis glomerata | Do. |

Similar results are obtained with composition (b) or (c).

Post-emergence

Flowerpots were filled with earth in a greenhouse and sown with seeds of the plants named below in Table II. The earth in the flower pots was treated about 2 weeks after sowing when the plants had developed 2 to 4 true leaves, with an aqueous dispersion obtained by diluting each of the compositions (a) and (d) set forth above with water. The quantity of the active substances employed corresponded in the case of the compound (a) to 2 kg./hectare, in the case of the compound (d) to 6 kg./hectare. The concentration of the active substance in each spraying liquor was 0.60% by weight. The results of the treatment were examined 3 weeks after the treatment.

The results are shown in the following Table II.

TABLE II

| Test plants | Composition(a) | Composition(d) |
|---|---|---|
| Pisum sativum | Practically no damage. | Only slightly inhibited. |
| Daucus carota | do | Practically no damage. |
| Linum usitatissimum | Only slightly inhibited. | Do. |
| Alopecurus pratensis | Heavy damage, cannot recover. | Completely killed. |
| Poa trivialis | do | Do. |
| Dactylis glomerata | Completely killed | Do. |

From the results set forth above in Tables I and II it can be seen that the compositions used in the claimed method practically do not inhibit the growth of important useful plants such as beans, peas, carrots, flax, and on the other hand, kill or damage heavily the grasses Alopecurus, Poa and Dactylis which of course, are highly undesired in cultures of the aforesaid useful plants.

(B) When the compositions (a) to (d) set forth above under (A) are applied at a rate of 3 to 10 kg. of active substance/hectare to an asparagus field all the weeds, growing in said field are completely or almost completely destroyed. On the other hand no damage can be observed in case of the asparagus. The following weeds have been killed: *Euphorbia helioscopia, Senecio vulgaris, Sonchus asper, Stellaria media, Chenopodium album,* Veronica species, *Thlaspi arvense, Poa annua.*

What is claimed is:
1. A method for selectively combating undesired plants growing beneath maize wherein there is applied to the area in which the herbicidal effect is desired, in an amount which is sufficient to kill the undesired plants a compound of the formula

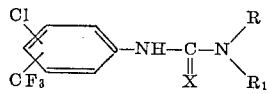

in which R represents lower alkyl, $R_1$ represents a member selected from the group consisting of hydrogen and lower alkyl, and X represents a member selected from the group consisting of oxygen and sulfur.

2. A method as claimed in claim 1, wherein N-3-trifluoromethyl-4-chlorophenyl-N',N'-dimethyl urea is applied at the rate of 10 kilograms per hectare.

3. A method for selectively combating undesired plants growing beneath carrots wherein there is applied to the area in which the herbicidal effect is desired, in an amount which is sufficient to kill the undesired plants a compound of the formula

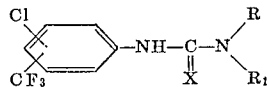

in which R represents lower alkyl, $R_1$ represents a member selected from the group consisting of hydrogen and lower alkyl, and X represents a member selected from the group consisting of oxygen and sulfur.

4. A method as claimed in claim 3 wherein N-3-trifluoromethyl-4-chlorophenyl-N',N'-dimethyl urea is applied at the rate of 2 to 6 kilograms per hectare.

5. A method for selectively combating undesired plants growing beneath peas wherein there is applied to the area in which the herbicidal effect is desired, in an amount which is sufficient to kill the undesired plants a compound of the formula

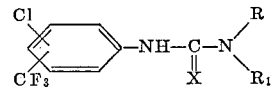

in which R represents lower alkyl, $R_1$ represents a member selected from the group consisting of hydrogen and lower alkyl, and X represents a member selected from the group consisting of oxygen and sulfur.

6. A method as claimed in claim 5, wherein N-3-trifluoromethyl-4-chlorophenyl-N',N'-dimethyl urea is applied at the rate of 2 to 6 kilograms per hectare.

7. A method for selectively combating undesired plants growing beneath asparagus wherein there is applied to the area in which the herbicidal effect is desired, in an amount which is sufficient to kill the undesired plants a compound of the formula

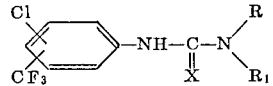

in which R represents lower alkyl, $R_1$ represents a member selected from the group consisting of hydrogen and lower alkyl, and X represents a member selected from the group consisting of oxygen and sulfur.

8. A method as claimed in claim 7, wherein N-3-trifluoromethyl-4-chlorophenyl-N',N'-dimethyl urea is applied at the rate of 3 to 10 kilograms per hectare.

References Cited by the Examiner

UNITED STATES PATENTS 2,655,447  10/1953  Todd _____ 71—2.6

OTHER REFERENCES

Abel, "Chemistry and Industry," 1957, pages 1106 to 1112.

Crafts, "The Chemistry and Mode of Action of Herbicides," Interscience Publishers, New York, 1961, pages 77 to 80 and 117 to 120.

LEWIS GOTTS, *Primary Examiner.*

JULIAN S. LEVITT, *Examiner.*

JAMES O. THOMAS, *Assistant Examiner.*